US009944511B2

(12) United States Patent
Liao et al.

(10) Patent No.: US 9,944,511 B2
(45) Date of Patent: Apr. 17, 2018

(54) FUEL CHANGING DEVICE

(71) Applicants: Ying-Chieh Liao, Taichung (TW); Yu-Kuo Liao, Taichung (TW)

(72) Inventors: Ying-Chieh Liao, Taichung (TW); Yu-Kuo Liao, Taichung (TW)

( * ) Notice: Subject to any disclaimer, the term of this patent is extended or adjusted under 35 U.S.C. 154(b) by 39 days.

(21) Appl. No.: 15/131,726

(22) Filed: Apr. 18, 2016

(65) Prior Publication Data

US 2017/0043750 A1 Feb. 16, 2017

(30) Foreign Application Priority Data

Aug. 11, 2015 (TW) ............................ 104212929 U

(51) Int. Cl.
*B60S 5/02* (2006.01)
*B67D 7/04* (2010.01)
*F02M 37/22* (2006.01)
*B67D 7/60* (2010.01)

(52) U.S. Cl.
CPC ................ *B67D 7/04* (2013.01); *B67D 7/60* (2013.01); *F02M 37/22* (2013.01)

(58) Field of Classification Search
CPC ............. F02M 37/22; B67D 7/60; B67D 7/04
USPC ............................................................ 141/27
See application file for complete search history.

(56) References Cited

U.S. PATENT DOCUMENTS 3,236,268 A * 2/1966 Simpson .................. F04B 9/14 141/27
6,155,465 A * 12/2000 Steiger .................. B67D 3/043 222/501
8,246,840 B1 8/2012 Blundy et al.
2005/0285396 A1* 12/2005 Martineau ................ E03C 1/02 285/328
2009/0179049 A1* 7/2009 Drummond ............. B67D 7/60 222/209

* cited by examiner

*Primary Examiner* — Timothy L Maust
*Assistant Examiner* — Andrew Schmid
(74) *Attorney, Agent, or Firm* — Muncy, Geissler, Olds & Lowe, P.C.

(57) ABSTRACT

A fuel changing device which is for connection with a fuel pipe or a fuel can is provided, including: a barrel, connected with a conduit portion communicating with an interior of the barrel; a plunger, including a piston movably received in the barrel and an operation rod connected with the piston and extending out of the barrel; an adapting mechanism, including an adapter connected to the conduit portion and at least one adapting tube, the adapter selectively detachably connected with one end of the adapting tube or for selectively detachably connected with a fuel connector of the fuel can, another end of the adapting tube being for detachably connected with the fuel pipe.

10 Claims, 6 Drawing Sheets

FUEL CHANGING DEVICE

BACKGROUND OF THE INVENTION

Field of the Invention

The present invention relates to a fuel changing device.

Description of the Prior Art

Generally, in a vehicle, it is usually to dispose a filter or fuel can within the fuel-way connected between the fuel tank and the engine, for filtering, processing or storing the fuel before the fuel goes into the engine. However, as the filter or fuel can (especially the fuel can) is used for a period of time, the impurities accumulate therein and the filter or fuel has to be replaced.

Conventionally, such as the disclosure of U.S. Pat. No. 8,246,840, a big reservoir is communicated with a high-pressure source using a plurality of pipes. The pipes are connected to the joint portion of the fuel can, and by using the high-pressure source the fuel in the fuel-way can be drained out or new fuel can be poured into the fuel can, thus completing changing of fuel or fuel can.

However, this kind of conventional device has a complicated structure, difficult to operate and has a big size, and thus the operation environment is so much limited, it is uneasy to store and it costs a lot.

The present invention is, therefore, arisen to obviate or at least mitigate the above mentioned disadvantages.

SUMMARY OF THE INVENTION

An object of the present invention is to provide a fuel changing device, in which it is easy and quick to change the fuel, and it is suitable for various types of fuel connectors of fuel pipe and fuel can.

To achieve the above and other objects, a fuel changing device which is for connection with a fuel pipe or a fuel can is provided, including: a barrel, connected with a conduit portion communicating with an interior of the barrel; a plunger, including a piston movably received in the barrel and an operation rod connected with the piston and extending out of the barrel; an adapting mechanism, including an adapter connected to the conduit portion and at least one adapting tube, the adapter selectively detachably connected with one end of the adapting tube or for selectively detachably connected with a fuel connector of the fuel can, another end of the adapting tube being for detachably connected with the fuel pipe.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
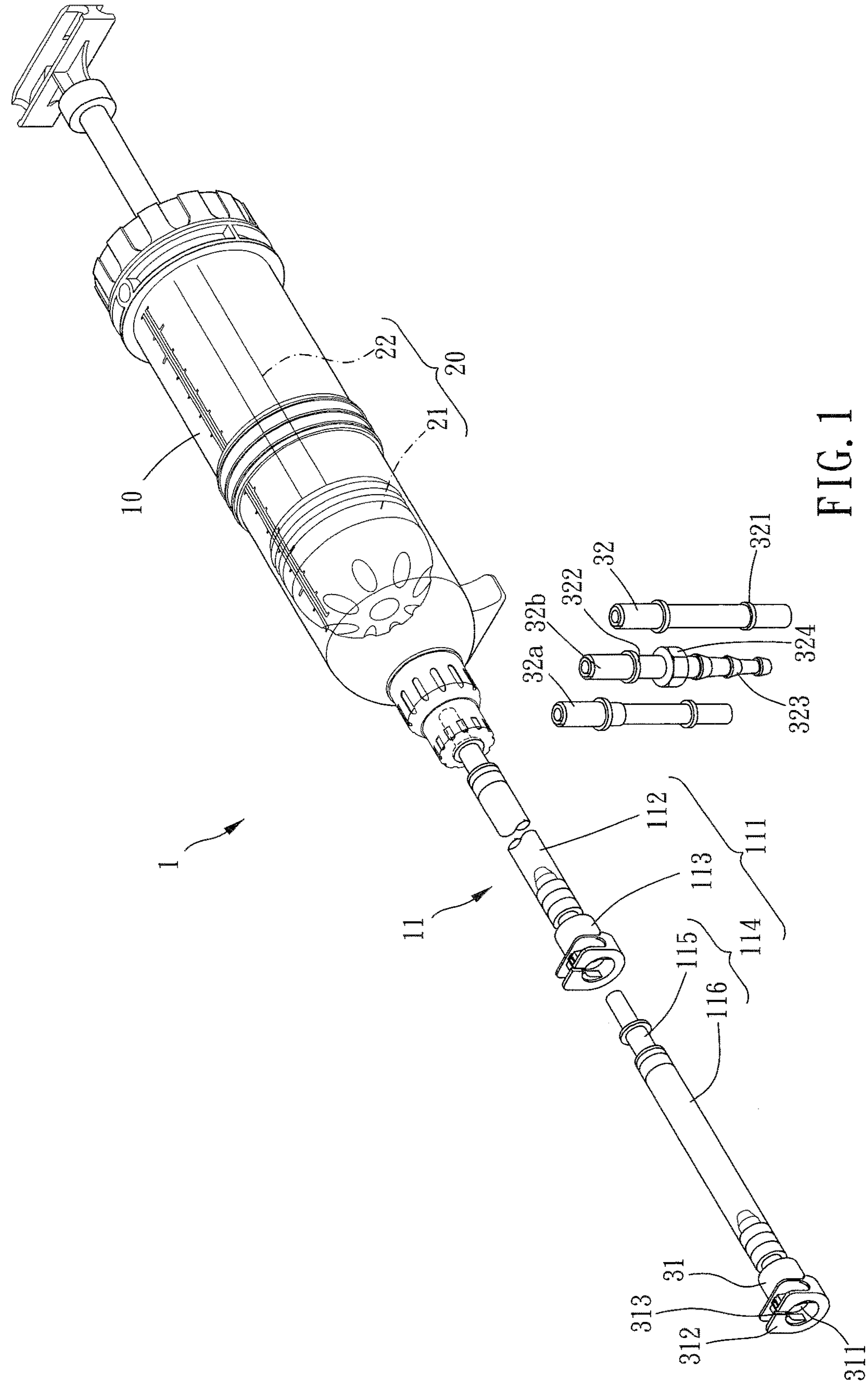
FIG. 1 is a drawing showing a preferred embodiment of the present invention.
Figure 2:
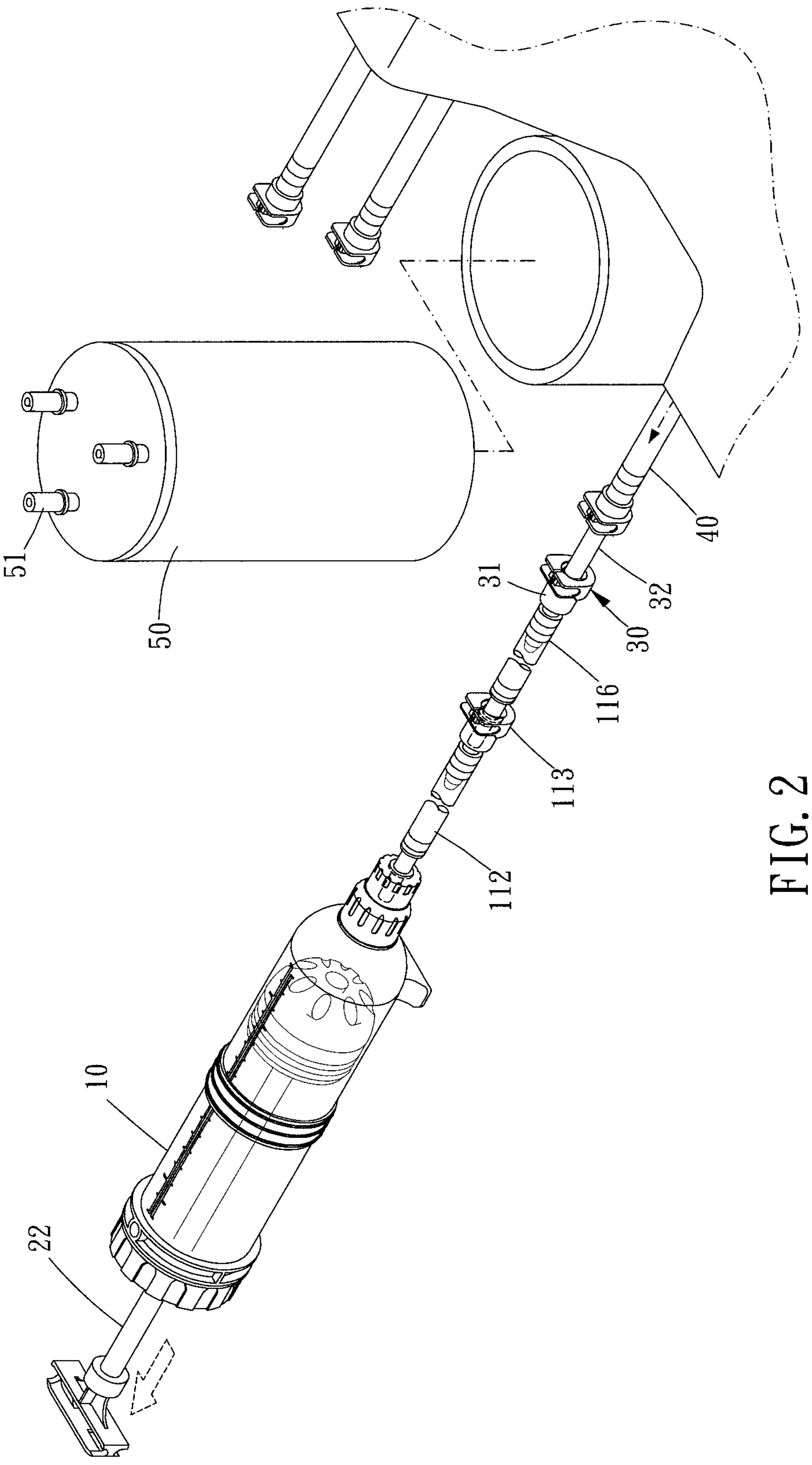
FIG. 2 is a drawing showing a preferable embodiment of the present invention in draining fuel.
Figure 3:
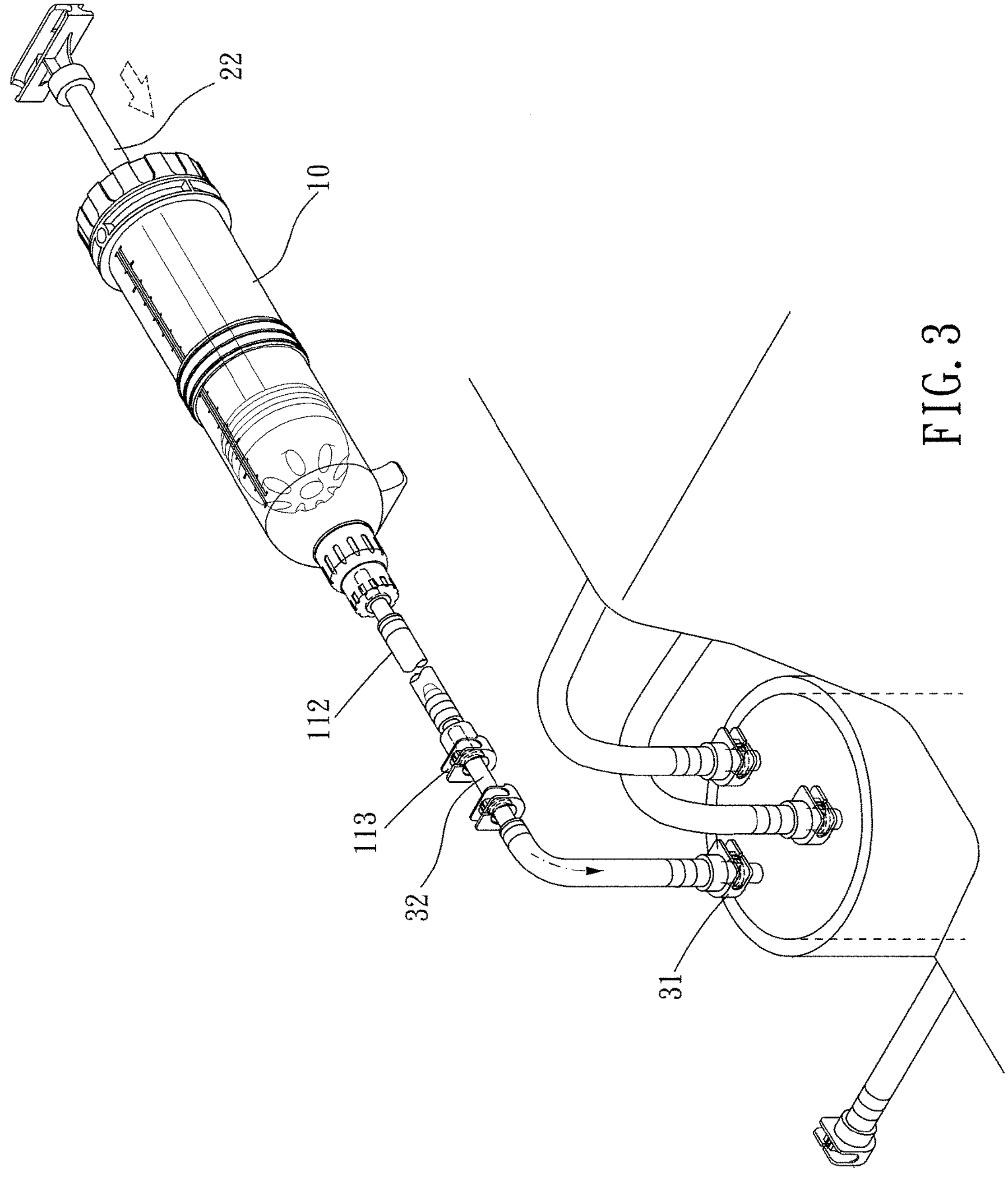
FIG. 3 is a drawing showing a preferable embodiment of the present invention in pouring fuel.

FIGS. 1-3 show a fuel changing device according to a preferred embodiment of the present invention. The fuel changing device 1 is for connection with a fuel pipe 40 or a fuel can 50. The fuel changing device 1 includes a barrel 10, a plunger 20 and an adapting mechanism 30.

The barrel 10 is connected with a conduit portion 11 communicating with an interior of the barrel 10. The plunger 20 includes a piston 21 movably received in the barrel 10 and an operation rod 22 connected with the piston 21 and extending out of the barrel 10. The adapting mechanism 30 includes an adapter 31 connected with the conduit portion 11 and at least one adapting tube 32 (metal or not metal). The adapter 31 is selectively detachably connected with one end of the adapting tube 32 or for selectively detachably connected with a fuel connector 51 of the fuel can 50, and another end of the adapting tube 32 is for detachably connected with the fuel pipe 40.

Specifically, the conduit portion 11 includes an extension tube 111, and the adapter 31 is connected with a distal end of the extension tube 111. The extension tube 111 is preferably a flexible tube; however, the extension tube may be a rigid tube. The extension tube 111 includes a main tube 112 connected to the barrel 10, a joint portion 113 disposed on one end of the main tube 112 and a secondary tube 114 detachably connected with the joint portion 113, and the adapter 31 is disposed on one end of the secondary tube 114. The secondary tube 114 includes a rigid connection tube 115 detachably connected with the joint portion 113 and a flexible connection tube 116 connected with the rigid connection tube 115, and the adapter 31 is disposed on one end of the flexible connection tube 116. The extension tube 111 may includes the main tube 112 and the joint portion 113, while the joint portion 113 is provided as a structure equivalent to the adapter 31.

Each of two opposite ends of the adapting tube 32 has a buckling flange 321 protruding radially, and the two buckling flanges 321 are detachably buckled with the adapter 31 and the fuel pipe 40 respectively. It is noted that two opposite ends of the adapting tube 32 have the same outer diameter, or two opposite ends of the adapting tube 32*a* may have different outer diameters, which can be suitable for fuel pipes with different diameters. The adapter 31 includes an insertion hole 311 and a blocking flange 312 extending radially outwardly relative to the insertion hole 311, and the blocking flange 312 has a through slit 313 which extends radially, communicates with the insertion hole 311 and is open on an outer circumferential surface of the blocking flange 312. When the adapter 31 is connected with the adapting tube 32, the adapting tube 32 is inserted within the insertion hole 311, the buckling flange 321 and the another end of the adapting tube 32 are located at opposite sides of the blocking flange 312, and the buckling flange 321 is blocked by the blocking flange 312.

Figure 6:
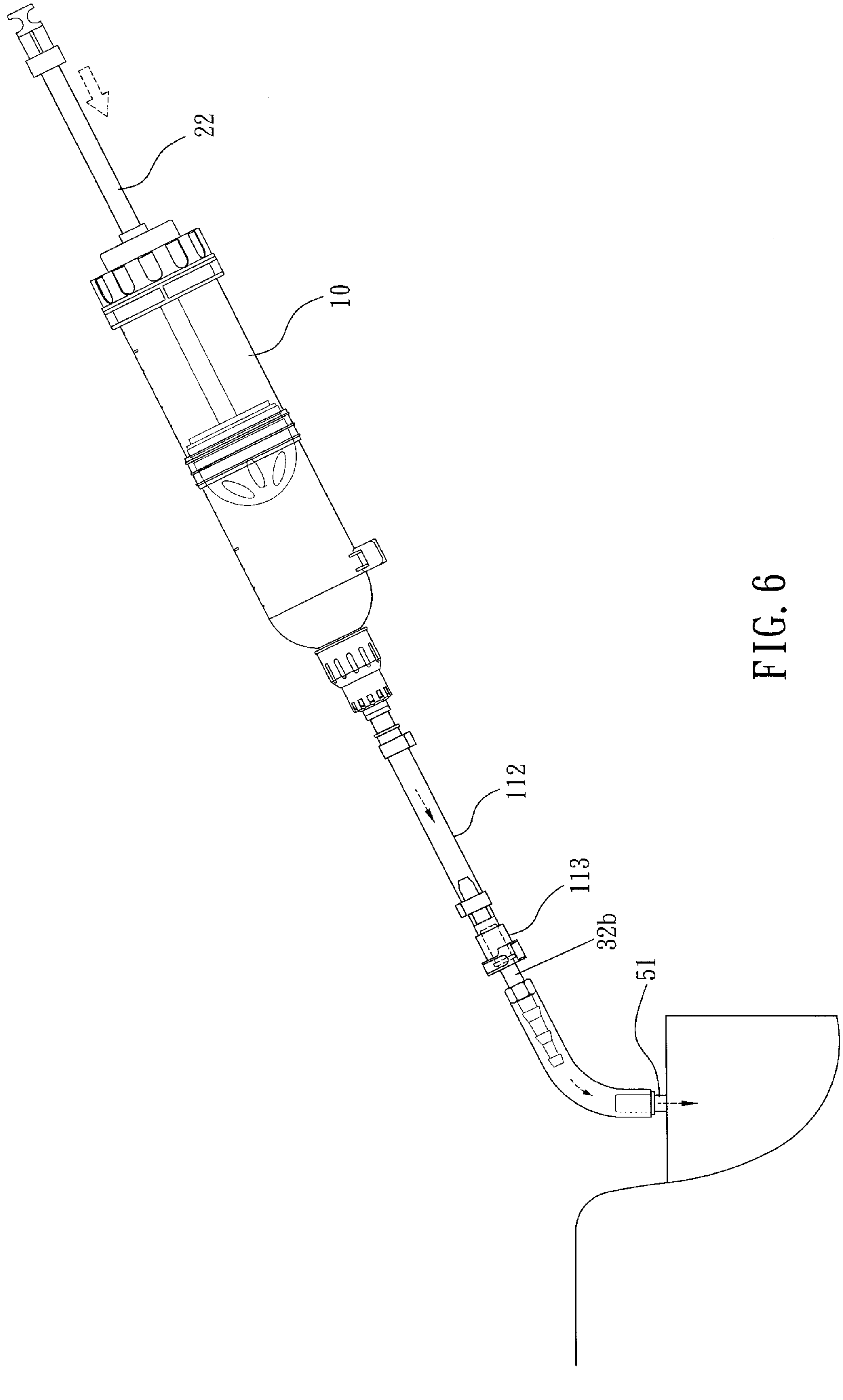
FIG. 6 is a drawing showing another preferable embodiment of the present invention in pouring fuel.

Alternatively, one end of an adapting tube 32*b* includes a buckling flange 322 and another end of the adapting tube 32*b* includes at least one buckling cone 323 protruding radially. The buckling flange 322 and the adapter 31 are detachably buckled with each other, and the buckling cone 323 is for being detachably buckled with the fuel pipe 40. For example, the fuel changing device 1 includes a plurality of buckling cones 323 distanced in sequence, and the buckling cones 323 are different from one another in radial dimension, thus being suitable for fuel pipes with different diameters, or for connection to the fuel connector 51 through a hose (see FIG. 6). Preferably, the adapting tube 32*b* further includes a non-round bulk body 324 (polygonal, hexagonal or the like) protruding radially, and the non-round bulk body 324 is located between the buckling flange 322 and the at least one buckling cone 323, thus providing blocking, positioning and/or easy installation.

Figure 4:
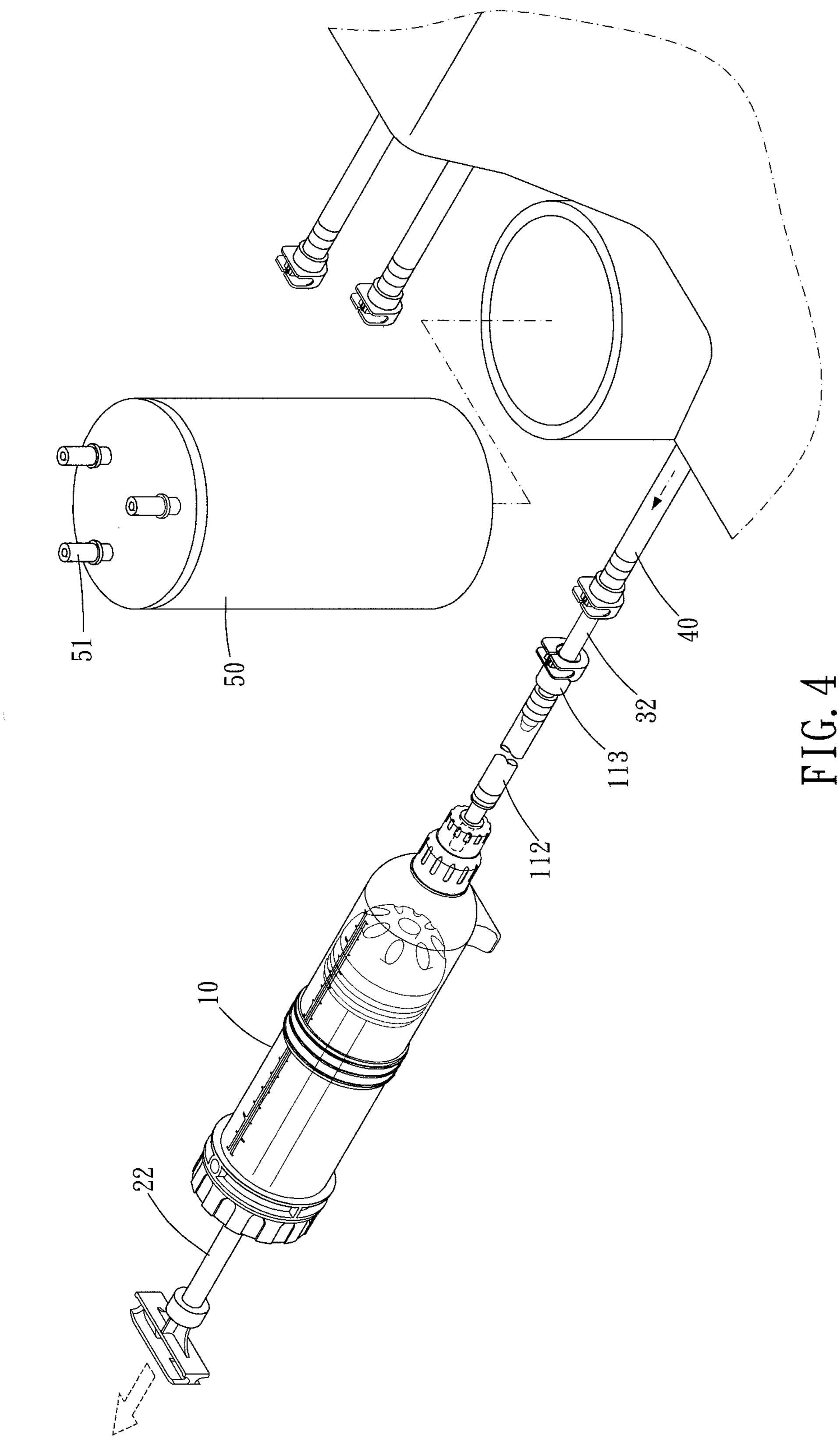
FIG. 4 is a drawing showing another preferable embodiment of the present invention in draining fuel.
Figure 5:
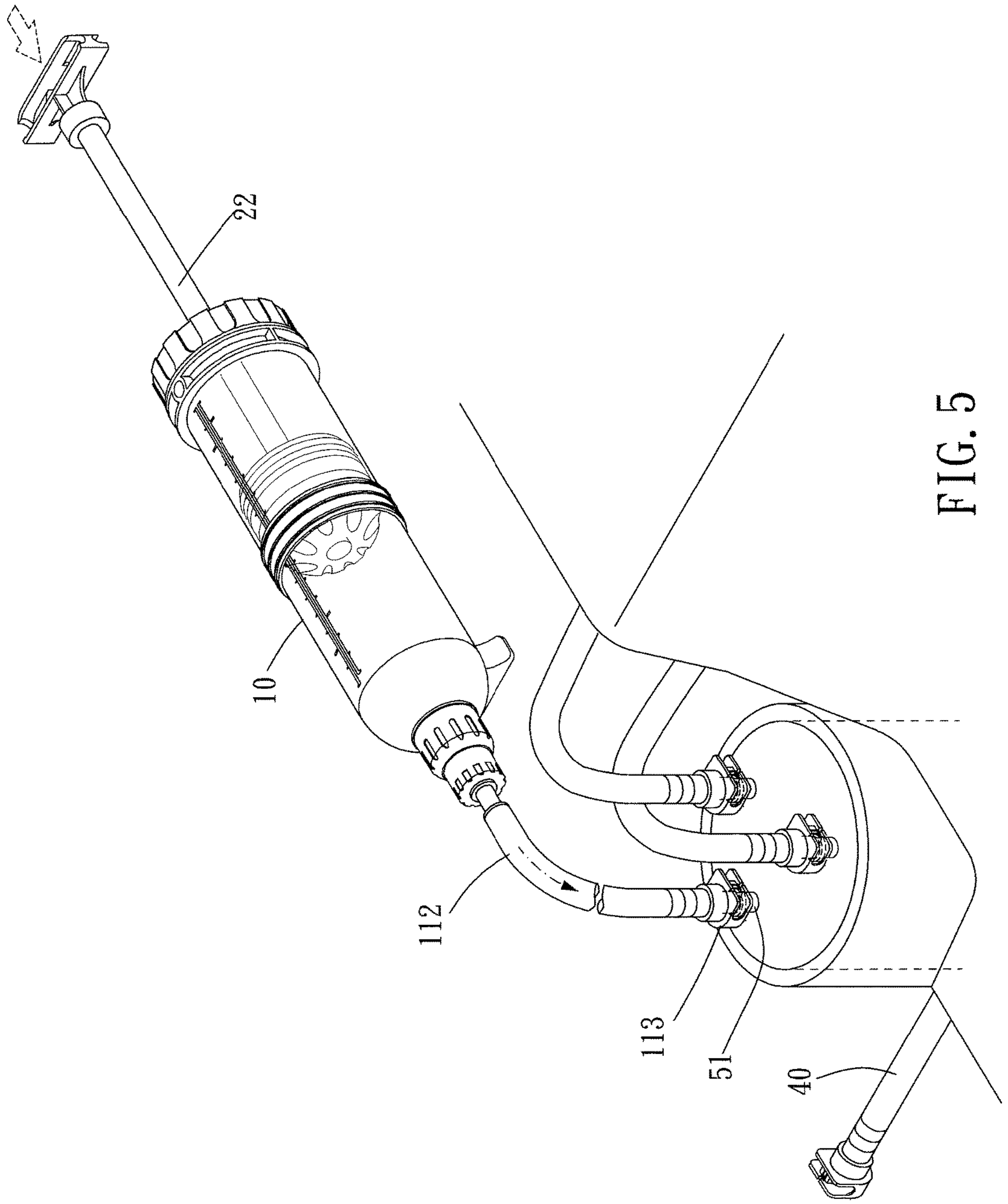
FIG. 5 is a drawing showing another preferable embodiment of the present invention in pouring fuel.

In practice, the fuel pipe 40 is first detached from a fuel can to be changed, the adapting tube 32 of the fuel changing device 1 can be connected with the fuel pipe 40 quickly, and the fuel can be drained into the barrel 10 (see FIGS. 2 and 4). The adapter 31 is then connected with a fuel connector 51 of a new fuel can 50, and the fuel is poured into the fuel can 50 (see FIGS. 3 and 5), so the fuel in the fuel pipe 40 and the fuel can 50 is continuous.

Given the above, the fuel changing device can drain fuel from the fuel pipe directly, and the adapter is then connected with the fuel connector of the new fuel can. As a result, it is easy and quick to change the fuel, and it is suitable for various types of fuel connectors of fuel pipe and fuel can.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A fuel changing device, for connection with a fuel pipe or a fuel can, including:

a barrel, connected with a conduit portion communicating with an interior of the barrel;

a plunger, including a piston movably received in the barrel and an operation rod connected with the piston and extending out of the barrel;

an adapting mechanism, including an adapter connected to the conduit portion and at least one adapting tube detachably connectable to the adapter, when the adapter is connected with one end of the adapting tube, another end of the adapting tube is configured to be detachably connected with the fuel pipe, when the adapting tube is detached from the adapter, the adapter is configured to be connected with a fuel connector of the fuel can;

wherein the adapter includes an insertion hole and a blocking flange extending radially outwardly relative to the insertion hole, and the blocking flange has a through slit which extends radially, communicates with the insertion hole and is open on an outer circumferential surface of the blocking flange;

wherein the adapting tube includes a buckling flange protruding radially, and when the adapter is connected with the adapting tube, the adapting tube is inserted within the insertion hole, the buckling flange and the another end of the adapting tube are located at opposite sides of the blocking flange, and the buckling flange is blocked by the blocking flange.

2. The fuel changing device of claim 1, wherein the conduit portion includes an extension tube, the adapter is connected with a distal end of the extension tube.

3. The fuel changing device of claim 2, wherein the extension tube is a flexible tube or rigid tube.

4. The fuel changing device of claim 2, wherein the extension tube includes a main tube connected to the barrel, a joint portion disposed on one end of the main tube and a secondary tube detachably connected with the joint portion, and the adapter is disposed on one end of the secondary tube.

5. The fuel changing device of claim 4, wherein the secondary tube includes a rigid connection tube detachably connected with the joint portion and a flexible connection tube connected with the rigid connection tube, and the adapter is disposed on one end of the flexible connection tube.

6. The fuel changing device of claim 1, wherein each of two opposite ends of the adapting tube has one of the buckling flange, and the two buckling flanges are detachably buckled with the adapter and the fuel pipe respectively.

7. The fuel changing device of claim 1, wherein two opposite ends of the adapting tube have different outer diameters.

8. The fuel changing device of claim 1, wherein one end of the adapting tube includes the buckling flange and the another end of the adapting tube includes at least one buckling cone protruding radially, the buckling flange and the adapter are detachably buckled with each other, and the buckling cone is for being detachably buckled with the fuel pipe.

9. The fuel changing device of claim 8, wherein the fuel changing device includes a plurality of the buckling cones distanced in sequence, and the buckling cones are different from one another in radial dimension.

10. The fuel changing device of claim 8, wherein the adapting tube further includes a non-round bulk body protruding radially, and the non-round bulk body is located between the buckling flange and the at least one buckling cone.

* * * * *